United States Patent [19]

Karlik, Jr. et al.

[11] 3,855,505

[45] Dec. 17, 1974

[54] SOLID ELECTROLYTE CAPACITOR

[75] Inventors: Steven Karlik, Jr., Palm Beach Gardens; William J. Hyland, Riviera Beach; Edward A. Souza, North Palm Beach; Ernest D. Ganz, Palm Beach Gardens, all of Fla.

[73] Assignee: National Components Industries, Inc., West Palm Beach, Fla.

[22] Filed: Apr. 3, 1972

[21] Appl. No.: 240,454

[52] U.S. Cl. .................. 317/230, 29/570, 117/216, 117/217, 357/72
[51] Int. Cl. ............................................. H01g 9/05
[58] Field of Search ........................... 317/230

[56] References Cited
UNITED STATES PATENTS

| | | | |
|---|---|---|---|
| 2,337,495 | 12/1943 | Rawlins | 337/248 X |
| 3,124,728 | 3/1964 | Ruben | 317/230 |
| 3,206,658 | 9/1965 | Markarian | 317/230 |
| 3,310,718 | 3/1967 | Lupfer | 317/258 |
| 3,341,752 | 9/1967 | Fournier | 317/230 |
| 3,612,955 | 10/1971 | Butherus | 317/235 X |
| 3,675,087 | 7/1972 | Zykov et al. | 317/230 |
| 3,686,535 | 8/1972 | Piper | 317/230 |

FOREIGN PATENTS OR APPLICATIONS 1,059,211 2/1967 Great Britain ............... 317/101 CC

OTHER PUBLICATIONS

Electronics, April 3, 1967, pp. 139–146.

*Primary Examiner*—Stanley D. Miller, Jr.
*Assistant Examiner*—William D. Larkins
*Attorney, Agent, or Firm*—Rudolph J. Jurick

[57] ABSTRACT

A solid electrolyte chip capacitor having external electrodes in the form of metal end caps electrically and mechanically secured to end portions of the capacitor body, thereby to minimize the length of the capacitor for a given capacitance-voltage characteristic.

5 Claims, 2 Drawing Figures

SOLID ELECTROLYTE CAPACITOR

BACKGROUND OF THE INVENTION

Solid electrolyte chip capacitors have a relatively small size making them particularly useful in thick and thin integrated, and hybrid circuitry. However, capacitors of this type heretofore available are either unencapsulated or molded. The unencapsulated capacitors require very careful handling and, having weak protruding terminal electrodes, they are difficult to solder to an electrical circuit without resultant electrical failures. In the case of the molded capacitors, the molding drastically reduces the volumetric efficiency of a capacitor having a given capacitance-voltage relationship.

A capacitor made in accordance with this invention is of rugged construction, of reduced inductive reactance at high frequencies, of minimum size for a given capacitance-voltage characteristic, and has novel terminal electrodes adapted for connection to an external circuit by reflow soldering techniques at elevated temperatures, thereby preventing electrode scavenging which is prevalent in capacitors of other constructions.

SUMMARY OF THE INVENTION

The capacitor comprises a body consisting of an anode made of a valve metal coated with a layer of solid electrolye and having a stem extending therefrom. The terminal electrodes are metallic end caps, the positive end cap being welded to the anode stem and mechanically bonded to an end portion of the body. The negative end cap is soldered to the other end portion of the body, or is secured thereto by means of a conductive adhesive which also serves as the means for establishing an electrical connection of this end cap to the capacitor body.

An object of this invention is the provision of a solid electrolyte capacitor of superior mechanical and electrical construction and which has a high volumetric efficiency.

An object of this invention is the provision of a solid electrolyte capacitor having terminal electrodes in the form of cup-like metallic end caps.

An object of this invention is the provision of a solid electrolyte capacitor having metallic end caps constituting the terminal electrodes, the negative end cap being secured in position by means which is not adversely effected by the application thereto of elevated temperature required in reflow soldering techniques, thereby to prevent electrode scavenging with resultant changes in the electrical connection and electrical characteristics.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
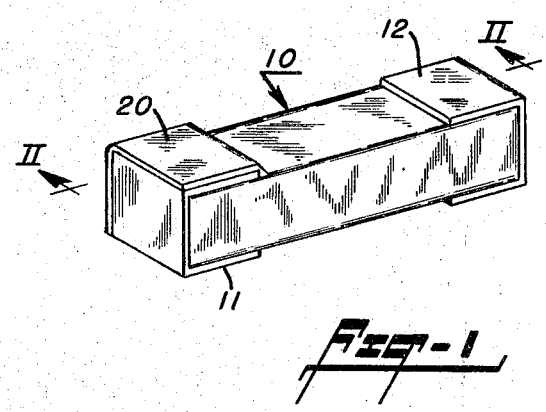
FIG. 1 is an isometric view of a capacitor made in accordance with this invention.
Figure 2:
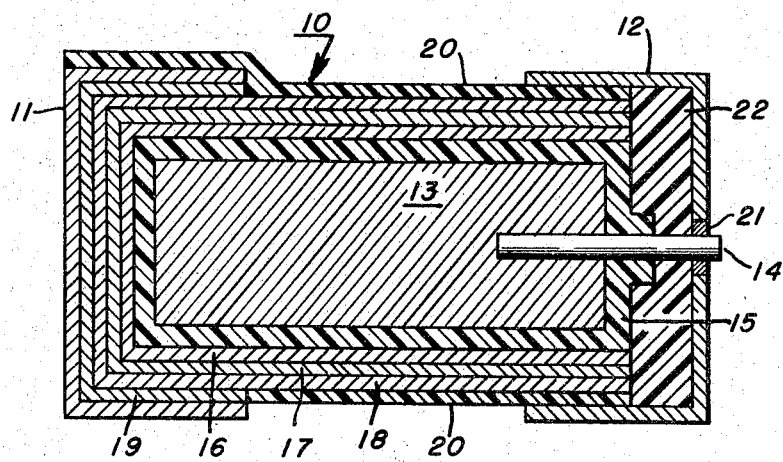
FIG. 2 is a cross-sectional view taken along the line II—II of FIG. 1 and drawn to an enlarged scale.

Referring to the drawings, the capacitor comprises a body 10 having metallic U-shaped end caps 11 and 12 secured to the end portions thereof, said caps constituting the terminal electrodes for connection of the capacitor to an electric circuit. The anode 13, of rectangular cross-section, is made of a suitable valve metal, preferably tantalum particles pressed together and sintered by conventional powdered metallurgical processes. Formed integrally with the anode, as by pressing or welding, is a solid tantalum stem 14. The anode is made anodic by suspending it in a liquid electrolyte through which an electric current is passed, thereby resulting in the formation of a dielectric tantalum oxide film 15, said film having a thickness consistent with the capacitance-voltage characteristic ultimately desired. The anode is then impregnated with a manganese nitrate solution which is converted by pyrolysis to a solid semiconductive manganese dioxide layer 16. In order to reduce the electrical resistance of the dioxide metal interface, a conductive coating 17 is formed over the semiconductive layer, such coating being formed by applying a colloidal suspension of graphite, followed by drying. Since carbon is not solderable, the coated anode is dipped into a solution comprising silver and a binder to form the outer conductive coating 18.

After drying the silver coating 18, the metal, U-shaped, solder-plated end cap 11 is attached. This can be done by applying a coating 19 of silver solder over the end portion of the silver coating 19 before the end cap is pressed into place, and then applying heat to form a homogeneous joint. However, in order to eliminate possible deterioration of this joint, which may occur upon the subsequent application of heat to the end cap, the cap preferably is attached by means of a conductive adhesive. Specifically, a coating of silver filled epoxy resin, applied by a brushing or dipping operation, is applied to the silver coating 18 in place of the solder coating 19. The end cap is pressed into place while the epoxy resin is in the fluid state, after which the resin is cured by heating the unit in a furnace. This results in a strong mechanical joint of low electrical resistance, which joint is not effected by the subsequent application of heat thereto.

For environmental protection, the unit with the end cap attached thereto is coated with a thin layer 20 of a suitable non-conductive material, preferably tetrafluorethylene. Other coating materials such as polyamides, silicones or polyesters may be used. The coating material, which can be applied by a brushing or dipping operation and then cured, covers the silver coating 18 as well as selected external surface areas of the end cap, the uncoated areas of the end cap being available for soldering the capacitor to an electrical circuit.

A non-conductive material 22, preferably tetrafluorethylene in a fluid state, is applied to the interior of the end cap 12 which then is inserted over the stem 14 and the end portion of the capacitor body, a central hole being provided in the bottom of the end cap for this purpose. This end cap, preferably made of solder-plated nickel, is welded to the stem as indicated by the numeral 21. Upon curing of the material 22, the end cap is securely bonded to the end surface of the anode, as well as to the encapsulating coating 20 and the stem.

The end caps have a thickness of the order of 0.005" and each end cap has side walls securely bonded to the end portions of the capacitor, thereby resulting in a solid, sturdy assemblage. Also, the end caps present relatively large surface areas to which external electrical connections can be made, while minimizing the overall length of the capacitor. Both of the end caps may be made of the same solder-plated metal and may be color coded or otherwise marked to indicate the polarity thereof. Preferably, the negative end cap 11 is made of a non-magnetic material, such as solder plated copper. In such case, a bulk quantity of randomly-oriented capacitors can be quickly and positively oriented, polarity-wise, by passing a permanent magnet over the capacitors, all of the positive, nickel end caps becoming attached to the magnet. This feature of magnetic polarity orientation of the capacitors is useful for the proper connection of capacitors into an electrical circuit by automatic means.

While the invention has been described with specific reference to a tantalum anode of rectangular configuration, it will be apparent that other valve metals such as aluminum, niobium, zirconium, may be used and that the capacitor may have other configurations such as cylindrical, oval, etc.

Having now described the invention what we desire to protect by letters patent is set forth in the following claims:

1. In a capacitor comprising a body formed of a valve metal anode and a solid electrolyte, said body having a stem extending therefrom; the improvement wherein the terminal electrodes of the capacitor are U-shaped metallic caps, wherein the negative polarity end cap is secured to one end of the body by an electrically-conductive adhesive, wherein the positive polarity end cap has an opening formed therein and includes a portion spaced from the other end of the body, wherein the said stem extends into the said opening and is electrically connected to the positive polarity end cap, wherein the space between the said portion of the positive polarity end cap and the end of the body is filled with a high temperature, non-conducting material, and wherein the said body is coated with a high temperature non-conducting coating which is intimately bonded thereto.

2. The invention as recited in claim 1, wherein the negative polarity end cap is made of a non-magnetic material and the positive polarity end cap is made of a magnetic material, wherein the said stem is welded to the positive polarity end cap, and wherein the said high temperature material and high temperature coating are tetrafluorethylene.

3. A capacitor comprising,
   a. a rectangular anode made of a valve metal and having a stem of the same material extending therefrom,
   b. a dielectric oxide coating formed over the surface of the anode,
   c. a solid electrolyte layer formed over the oxide coating,
   d. a conducting coating formed over the electrolyte layer,
   e. a first U-shaped metallic end cap having side walls extending along one end portion of said anode,
   f. an electrically-conducting adhesive securing the first end cap to the said conducting coating,
   g. a second U-shaped end cap having a base portion spaced from the other end portion of the anode,
   h. means forming an opening in the base portion of the second end cap, the said stem extending into the opening and being electrically connected to the end cap,
   i. a high temperature non-conducting material filling the space between the said base portion of the second end cap and the proximate end of the anode, and
   j. a high temperature non-conducting outer coating formed over the said conducting coating and intimately bonded thereto.

4. The invention as recited in claim 3, wherein the said first end cap is made of a non-magnetic material and wherein said second end cap is made of a magnetic material.

5. The invention as recited in claim 3, wherein the said non-conducting outer coating and the said non-conducting material are tetrafluorethylene, and wherein the said outer coating also extends over a portion of the outer surface of the said first end cap.

* * * * *